United States Patent
Teo

(10) Patent No.: US 10,259,580 B2
(45) Date of Patent: Apr. 16, 2019

(54) AIRPLANE CABIN PANORAMIC VIEW SYSTEM

(71) Applicant: The Boeing Company, Chicago, IL (US)

(72) Inventor: David Teo, Edmonds, WA (US)

(73) Assignee: THE BOEING COMPANY, Chicago, IL (US)

(*) Notice: Subject to any disclaimer, the term of this patent is extended or adjusted under 35 U.S.C. 154(b) by 317 days.

(21) Appl. No.: 14/706,229

(22) Filed: May 7, 2015

(65) Prior Publication Data

US 2016/0325836 A1 Nov. 10, 2016

(51) Int. Cl.
| | | |
|---|---|---|
| B64D 11/00 | (2006.01) |
| H04N 7/18 | (2006.01) |
| H04N 5/232 | (2006.01) |
| B64C 1/14 | (2006.01) |
| B64D 47/08 | (2006.01) |

(52) U.S. Cl.
CPC .......... B64D 11/0015 (2013.01); B64C 1/14 (2013.01); B64D 47/08 (2013.01); H04N 5/23238 (2013.01); H04N 7/183 (2013.01); B64C 1/1484 (2013.01); B64D 2011/0061 (2013.01)

(58) Field of Classification Search
CPC ............. B64D 11/0015; B64D 47/08; B64D 2011/0061; B64C 1/14; B64C 1/484; H04N 5/23238; H04N 7/183
USPC .......................................................... 348/36
See application file for complete search history.

(56) References Cited

U.S. PATENT DOCUMENTS

| | | | |
|---|---|---|---|
| 5,231,435 A | 7/1993 | Blakely | |
| 2002/0093564 A1* | 7/2002 | Israel | H04N 7/106 348/145 |
| 2010/0005495 A1 | 1/2010 | Stavaeus et al. | |
| 2010/0157063 A1 | 6/2010 | Basso et al. | |
| 2012/0325962 A1 | 12/2012 | Barron | |

(Continued)

FOREIGN PATENT DOCUMENTS

| | | |
|---|---|---|
| EP | 2557037 A2 | 2/2013 |
| EP | 2851281 A1 | 3/2015 |

(Continued)

OTHER PUBLICATIONS

European Patent Office; Extended European Search Report for EP Application No. 16166158.2 dated Oct. 10, 2016.

*Primary Examiner* — William C Vaughn, Jr.
*Assistant Examiner* — Jae N Noh
(74) *Attorney, Agent, or Firm* — Parsons Behle & Latimer

(57) ABSTRACT

A system and method for displaying on a display inside of an aircraft a panoramic view of a view outside the aircraft. The system includes a window plug configured to fit into a window of an aircraft. The window plug includes a camera positioned to capture video outside of the aircraft and a display positioned over the window plug. The camera and display are connected to a processor to display the captured video on the display. The system may include a control panel that controls the operation of the camera and display. A device may be used to control pan and zoom features of the camera. A plurality of cameras may be connected to the processor, which may combine the captured videos from the plurality of cameras to display a single panoramic video on a single display or a plurality of displays. The combined video may be a 3D video.

19 Claims, 7 Drawing Sheets

(56) References Cited

U.S. PATENT DOCUMENTS

| | | | |
|---|---|---|---|
| 2013/0169807 A1* | 7/2013 | de Carvalho | H04N 7/183 |
| | | | 348/144 |
| 2013/0342695 A1 | 12/2013 | Larsen et al. | |
| 2014/0160285 A1 | 6/2014 | Barrou et al. | |
| 2015/0077337 A1 | 3/2015 | Coto-Lopez et al. | |
| 2016/0090196 A1* | 3/2016 | Besettes | B64C 1/1407 |
| | | | 244/129.5 |

FOREIGN PATENT DOCUMENTS

| | | |
|---|---|---|
| JP | H0342372 | 3/1993 |
| WO | 2014167038 A1 | 10/2014 |

* cited by examiner

AIRPLANE CABIN PANORAMIC VIEW SYSTEM

FIELD OF THE DISCLOSURE

The embodiments described herein relate to a system and method for capturing and displaying a panoramic view of the environment outside of an aircraft to the passengers inside the aircraft.

BACKGROUND

Description of the Related Art

Aircraft are presently designed with windows in the passenger cabins to permit passengers to view outside of the aircraft. However, the windows in the cabins are typically limited in size because of structural constraints. The small size of cabins windows may limit visibility outside of the aircraft to passengers seated in window seats even though most passengers would like to see outside of the aircraft during the duration of a flight. The size of the windows of a cabin is limited due to structural constraints on the aircraft, thus limiting the view outside of the cabin.

Recently a panoramic window has been designed in an attempt to increase the viewing area outside of a cabin. However, the implementation of these wider panoramic windows requires the redesign of the aircraft primary and secondary structure to include these windows. The panoramic windows may not be used in previously constructed and designed aircraft without major design and certification efforts, thus limiting the applicability. For example, the panoramic window could not be used in an aircraft cabin without major modifications to the cabin to ensure the structural integrity of the aircraft. Further limiting the applicability, the design for a panoramic window on one aircraft model is not easily adaptable to another aircraft model. Therefore, there exists a need for systems and methods to improve the views of the external environment in previously constructed aircraft.

SUMMARY

The present disclosure is directed to a method and system that overcomes some of the problems and disadvantages discussed above.

One embodiment of the present disclosure is an apparatus comprising a first window plug configured to fit in a first window of an aircraft and a first camera positioned within the first window plug, the first camera positioned to capture video of a first area outside the aircraft. The apparatus comprises a flat panel display and a processor, the first camera communicating with the processor as an input and the processor communicating with the flat panel display as an output. The apparatus comprises a control panel communicating with the processor, the control panel being configured to control operation of the flat panel display. The control panel can cause the flat panel display to display the captured video of the first area outside the aircraft by the first camera.

The control panel may be able to cause the flat panel display to display a video other than the captured video of the first area outside the aircraft. The control panel may wirelessly communicate with the processor. The apparatus may comprise a second window plug configured to fit in a second window of the aircraft and a second camera positioned within the second window plug, the second camera positioned to capture video of a second area outside the aircraft. The second camera may communicate with the processor as an input. The control panel may cause the flat panel display to display the captured video of the first area outside the aircraft captured by the first camera and to display the capture video of the second area outside the aircraft by the second camera. The processor may be configured to combine the captured video of the first area and the captured video of the second area to display a single video on the flat panel display. The single video on the flat panel display may be a 3D video. The flat panel display may cover both the first window plug and the second window plug. The apparatus may comprise a user control device configured to control a zoom function and a pan function on the first camera.

Another embodiment of the present disclosure is a system comprising an aircraft having a cabin with a plurality of windows, a processor, and a first display being an output to the processor. The system comprises one or more first window plugs each including a camera, each one or more first window plugs being positioned within a window of the cabin to capture video of an outside area of the aircraft, each camera being an input to the processor. The system comprises a control panel connected to the processor, the control panel configured to control operation of the first display, wherein the control panel is configured to control the display on the first display of the captured video by the one or more cameras of the one or more first window plugs.

The first display may generate a 3D video from captured video from at least two cameras from the one or more first window plugs. The system may comprises a second display being an output to the processor and one or more second window plugs each including a camera, each one or more second window plugs being positioned within a window of the cabin to capture video of an outside area of the aircraft, each camera being an input to the processor. The control may be configured to control operation of the second display, wherein the control panel may be configured to control the display on the second display the captured video by the one or more cameras of the one or more second window plugs.

The first display may be positioned adjacent to the second display. The first display and the second display may form a single viewing area. The processor may be configured to combine the captured video by the one or more cameras of the one or more first window plugs with the captured video by the one or more cameras of the one or more second window plugs to display a combined single video on the first and second displays. The combined single video on the first and second displays may be a 3D video. The system may comprise a video device connected as an input to the processor. The processor may be configured to display a video from the video device on the first display instead of the captured video of the area outside of the cabin by the one or more cameras of the one or more first window plugs. The system may comprise a user control device configured to control pan and zoom functions of the one or more cameras of the one or more first window plugs.

Yet another embodiment of the present disclosure is a method of creating a panoramic view in an aircraft cabin comprising positioning a first window plug within a first window of an aircraft cabin, the first window plug comprising a first camera. The method comprises connecting the first camera as an input to a processor and positioning a first display over the first window plug within the aircraft cabin. The method comprises connecting the first display as an output to the processor.

The method may comprise displaying a captured video of a first area outside the aircraft by the first camera on the first display within the aircraft cabin. The method may comprise connecting a control panel to the processor, wherein the control panel controls the display of the captured video on the first display. The method may comprise positioning a second window plug within a second window of the aircraft cabin, the second window plug comprising a second camera. The method comprising connecting the second camera as an input to the processor, wherein the first display is positioned over both the first and second window plugs. The method may comprise combining the captured video for the first area outside the aircraft by the first camera with a capture video of a second area outside the aircraft by the second camera and displaying the combined captured videos from the first and second cameras as a single video on the first display. Displaying the combined captured videos may further comprise displaying a 3D video.

The method may comprise positing a second window plug within a second window of the aircraft cabin, the second window plug comprising a second camera. The method may comprise connecting the second camera as an input to the processor and positioning a second display over the second window plug within the aircraft cabin. The method may comprise connecting the second display as an output to the processor and displaying a captured video of a second area outside of the aircraft by the second camera on the second display within the aircraft cabin. The processor may combine the captured video from the first camera with the captured video from the second camera to display a combined single video on the first and second displays. The combined single video may be a 3D video.

Figure 1:
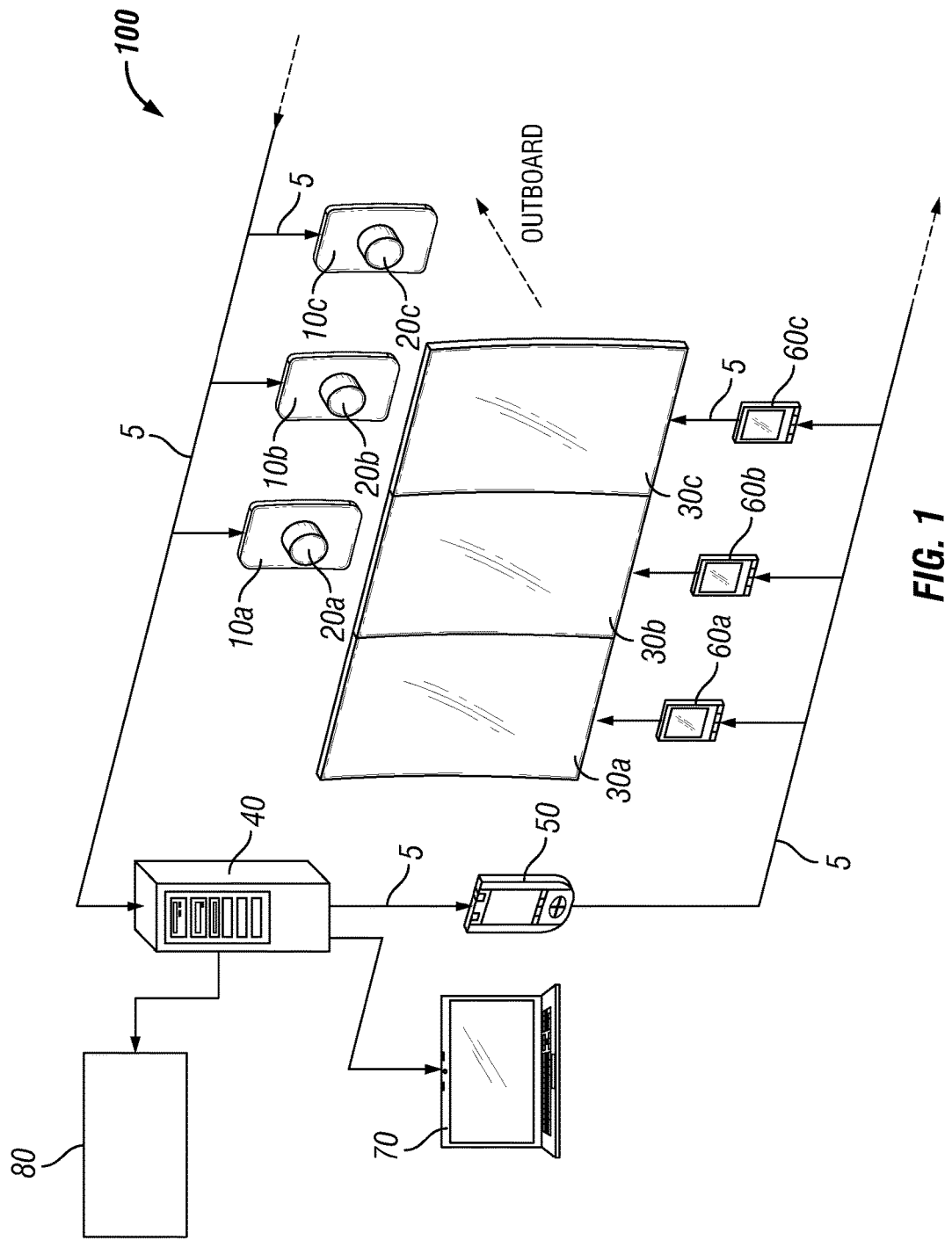
FIG. 1 is a schematic of an embodiment of a panoramic view system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a schematic of an aircraft display system 100 that may be used to display a panoramic view of an area that is outside of the aircraft. The system includes a plurality of window plugs 10 that are configured to fit within existing windows 2 of an aircraft. Each plug 10 may include a camera 20 that is positioned within the plug 10 so as to permit images and/or video exterior to the aircraft to be captured by the camera 20 as indicated by the arrow labeled outboard. The system may include a first window plug 10a including a first camera 20a, a second window plug 10b including a second camera 20b, and a third window plug 10c including a third camera 20c. The number of window plugs 10 and cameras 20 shown in FIG. 1 are for illustrative purposes only and may be varied as would be appreciated by one of ordinary skill in the art having the benefit of this disclosure. As described below, the window plugs 10 are positioned within windows 2 of an aircraft such that the cameras 20 are positioned to capture images and/or video of the area exterior the aircraft via the existing windows 2 of the aircraft.

The system 100 may include a processor 40 that is connected to the cameras 20a, 20b, and 20c via wires 5 as inputs to the processor 40. The processor 40 is also connected a plurality of displays 30a, 30b, and 30c via wires 5 as outputs to the processor 40. The displays 30 may be various flat panel displays that provide a high resolution picture and may be relatively thin. For example, the display 30 may be a high-definition (HD) organic light-emitting diode (OLED) display. The processor 40 is configured to display images and/or video from the plurality of cameras 20 on the displays 30, which may be positioned within a cabin 1 of an aircraft. The processor 40 and/or display 30 may include hardware and/or software to limit and/or control the effects of vibration and/or movement of the aircraft on the image and/or video captured by cameras 20 and displayed on the displays 30. A control panel 50 may be connected to the processor 5010 and/or displays 30 via wires 5 to control the operation of the displays 30 and/or cameras 20. Further, user control devices 60a, 60b, and 60c may be connected to the processor 40 and/or displays 30 via wires 5. The user control devices 60 may be used to further control the operation of the system 100 so that a user may control the operation of an individual display 30 and/or camera 20. For example, a user control device 60a may be able to control zoom and/or pan function of a corresponding camera 20a and thus, change the image and/or video being displayed on a corresponding display 30a.

An electronic device 70 may also be connected as an input to the processor 40 via a wire 5. The electronic device 70 may be used to display various images and/or video on the displays 30 connected to the processor 40 as outputs. For example, the device 70 may provide video content that may be shown on the displays 30 instead of video and/or images captured from cameras 20 of the system 100. The electronic device 70 may be a laptop, tablet, smart phone, DVD player, or other various electronic media devices as would be appreciated by one of ordinary skill in the art having the benefit of this disclosure. The various components of the system 100 such as the cameras 20, displays 30, processor(s) 40, control panel(s) 50, user control devices 60, and electronic device(s) 70 may be wirelessly connected to each other as would be appreciated by one of ordinary skill in the art having the benefit of this disclosure.

The system 100 could be used as part of a security system while the aircraft is on the ground. The cameras 20 may be used to capture images and/or video of the external environment of the aircraft. The captured images and/or video may be transmitted to a remote monitoring location 80. The images and/or video could be transmitted wirelessly or via a wire to the remote location. The remote location 80 could remotely use the processor 40, control panel 50, and/or user control devices 60 to control the operation of the cameras 20. For example, the remote location 80 could remotely control the zoom and/or pan of the cameras 20 to capture areas of interest outside of the aircraft.

The displays 30a, 30b, and 30c may be positioned adjacent to each other to form a single contiguous displaying area as shown in FIG. 1. The processor 40 may be configured to combine images and/or video captured by the cameras 20a, 20b, and 20c and display as a single seamless panoramic image and/or video on the displays 30a, 30b, and 30c. Alternatively, the processor 40 may be configured to combine images and/or video captured by multiple cameras 20a, 20b, and 20c into a single seamless image and/or video to be displayed on a single display 30 as detailed herein. For example, images and/or video from multiple cameras 20 may be combined to display a 3D video on a display 30 having 3D capability, which may require user's to use 3D eyewear.

Figure 2:
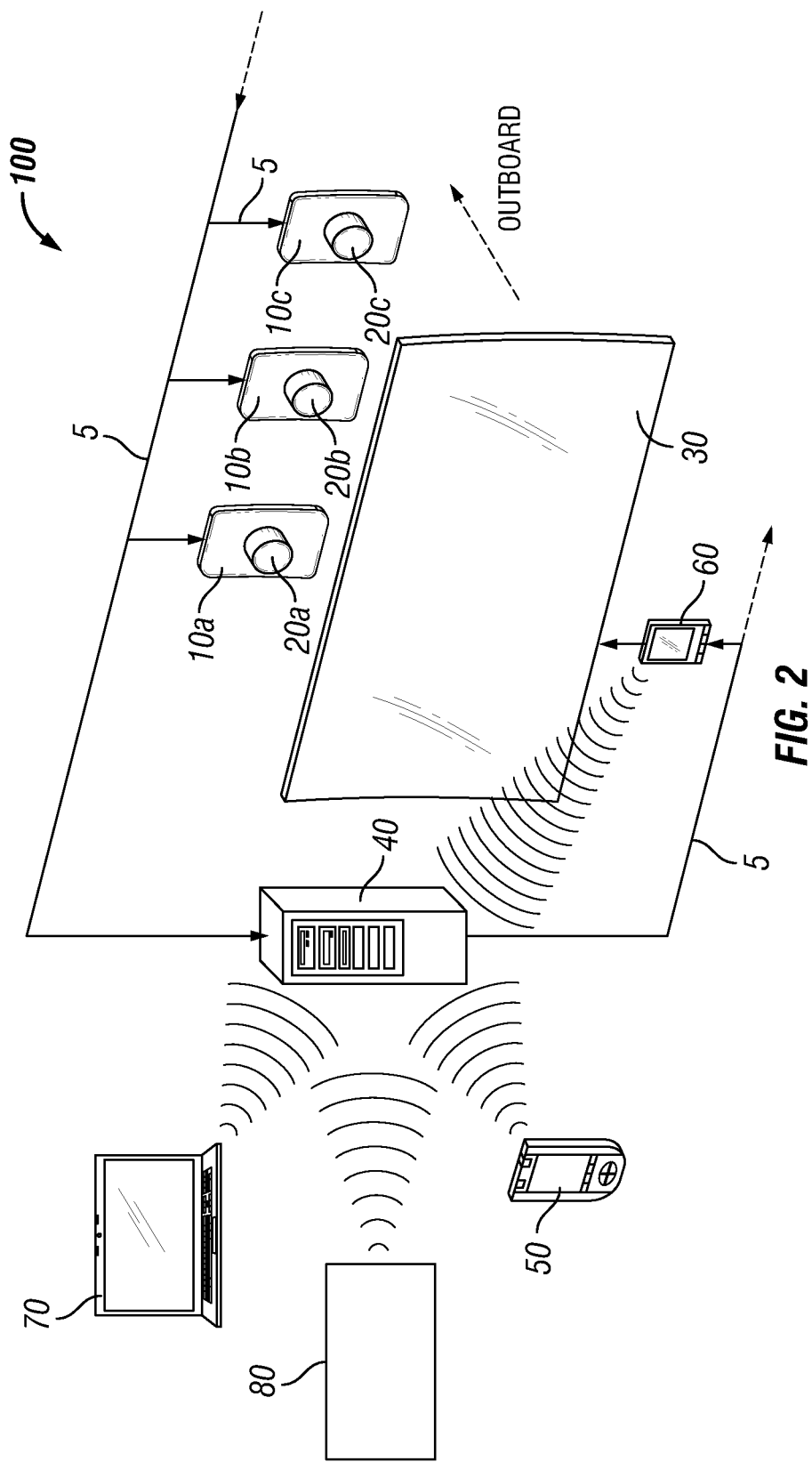
FIG. 2 is a schematic of an embodiment of a panoramic view system.

FIG. 2 shows a schematic of an embodiment aircraft display system 100 that may be used to display a panoramic view of an area that is outside of the aircraft. As discussed above, the system includes a plurality of window plugs 10 configured to fit within existing windows 2 of an aircraft. Each plug 10 includes a camera 20 that is positioned within the plug 10 so as to permit images and/or video exterior to the aircraft to be captured by the camera 20 as indicated by the arrow labeled outboard. A plurality of cameras 20 may be connected to a single display 30 via a processor 40. For example, cameras 20a, 20b, and 20c may be connected to a processor 40 via wires 5. The cameras 20a, 20b, and 20c may be connected wirelessly to the processor 40 as would be appreciated by one of ordinary skill in the art. The processor 40 may be configured to combine images and/or video captured by the cameras 20a, 20b, and 20c into a single image and/or video that is displayed on a single display 30 connected to the processor 40 as an output via wire 5. The display 30 may be connected wirelessly to the processor 40 as would be appreciated by one of ordinary skill in the art. The combined single image and/or video displayed on the single display 30 may be a panoramic video and/or a 3D video of the view exterior from the cameras 20a, 20b, and 20c. A control panel 50 may be wirelessly connected to the processor 40 and may be used to control the display of video on the display 30. A user control device 60 may also be wirelessly connected to the processor 40 and may be used to control functions of the cameras 20a, 20b, and 20c such as zoom and/or pan. The control device 60 may be configured to permit a user to temporarily track an external object. For example, the control device 60 may automatically pan, zoom, and/or autofocus a camera 20 to track an object selected by a user. An electronic device 70 may also be wirelessly connected as an input to the processor 40 enabling the processor 40 to display an image and/or video from the electronic device 70 rather than from the cameras 20a, 20b, and 20c.

Figure 3:
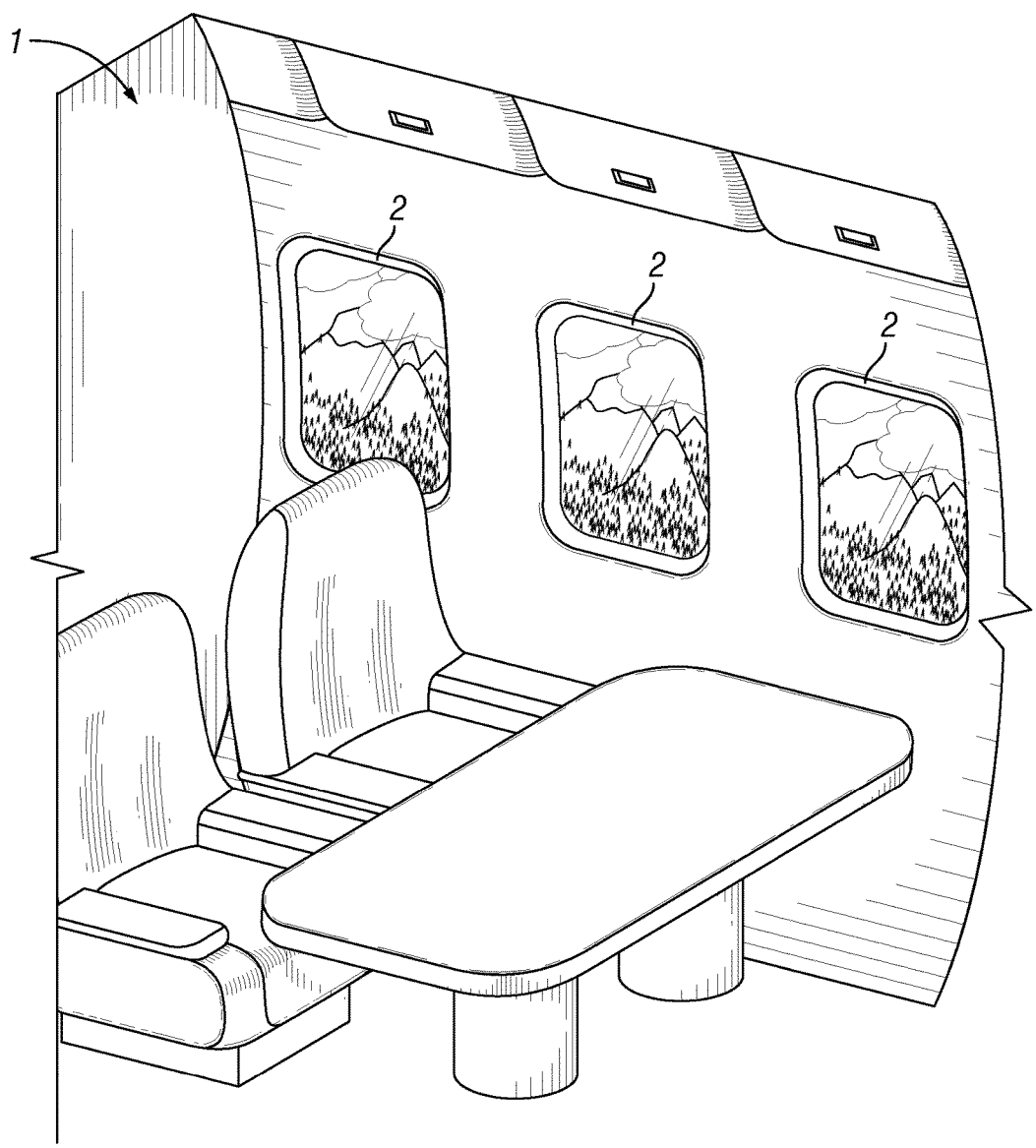
FIG. 3 shows a portion of an aircraft cabin with windows.

FIG. 3 shows a portion of a cabin 1 of an aircraft having a plurality of windows 2. The size of the windows 2 is limited due to structural constraints on the aircraft, thus limiting the view outside of the cabin 1. As discussed above, a "panoramic window" 30, as shown in FIG. 2, has been developed. However, the "panoramic window" 30, as shown in FIG. 2, could not be used in the cabin 1 shown in FIG. 3 without major modifications to the cabin 1 to ensure the structural integrity of the aircraft.

Figure 4A:
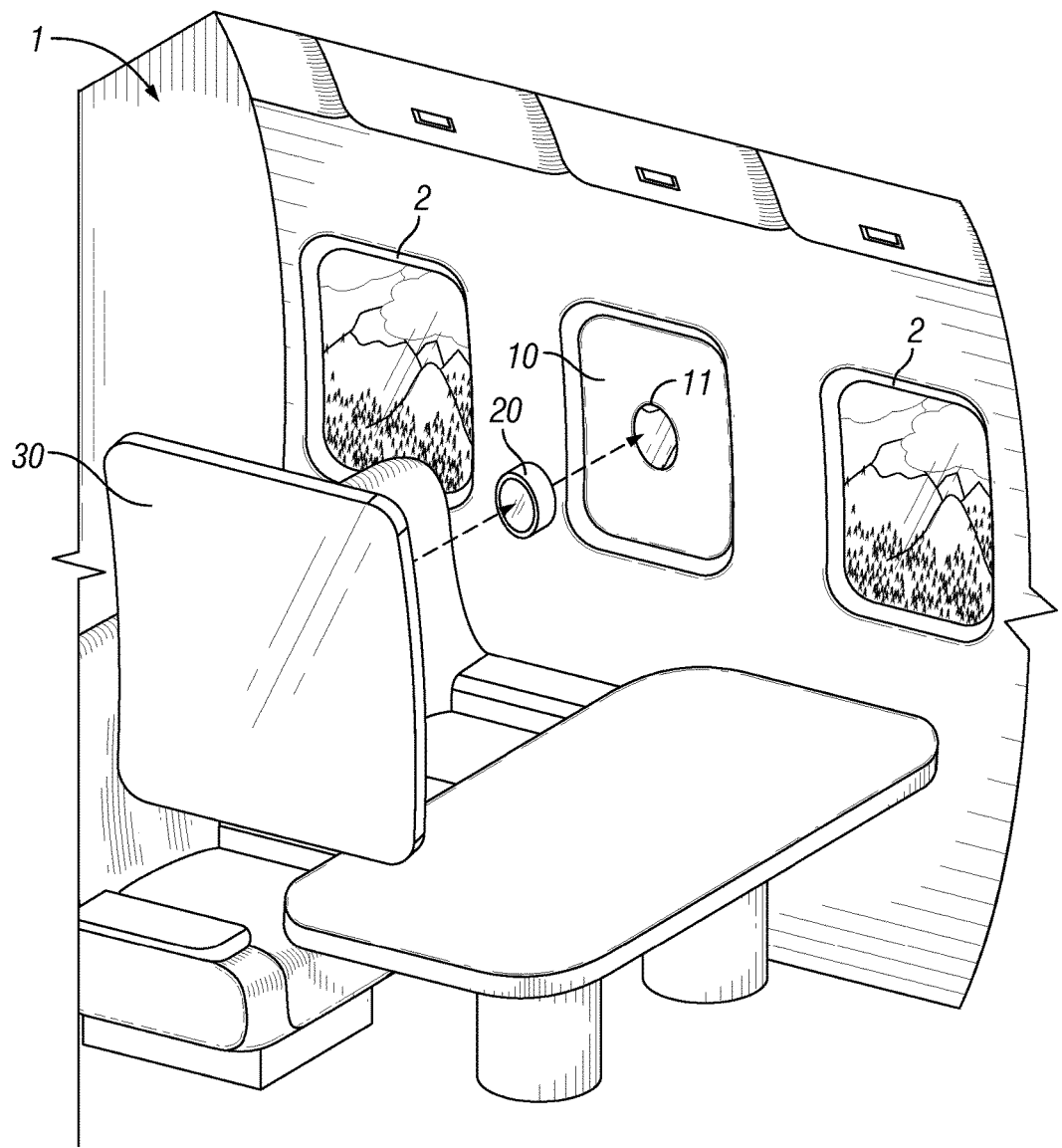
FIG. 4A shows a portion of an aircraft cabin with a partially exploded view of a portion of components of a panoramic view system.

FIG. 4A shows a portion of an aircraft cabin 1 with a plurality of windows 2. FIG. 4A shows an exploded view of some of the components of an aircraft display system to better illustrate a potential positional relationship of the components. A window plug 10 is positioned within a window 2 of the cabin 1. The window plug 10 includes an aperture 11 configured to receive a camera 20. The camera 20 within the aperture of the window plug 10 is positioned to capture an image and/or video of an area outside of the cabin 1 of the aircraft. A display 30 may be then positioned over the window 2 and the window plug 10. As discussed above, images and/or video from the camera 20 may be displayed on the display 30. The display 30 may provide passengers within the cabin 1 with the feeling that the cabin 1 is more spacious as the display 30 is larger than the window 2. The use of window plugs 10, cameras 20, and displays 30 permits the retrofitting of the system 100 into an existing aircraft. The use of the system 100 may permit the display of a panoramic or 3D view outside of the aircraft and the use of displays 30 larger than the windows 2 may provide passengers with a better outside view as well as make the cabin 1 appear to be more spacious.

Figure 4B:
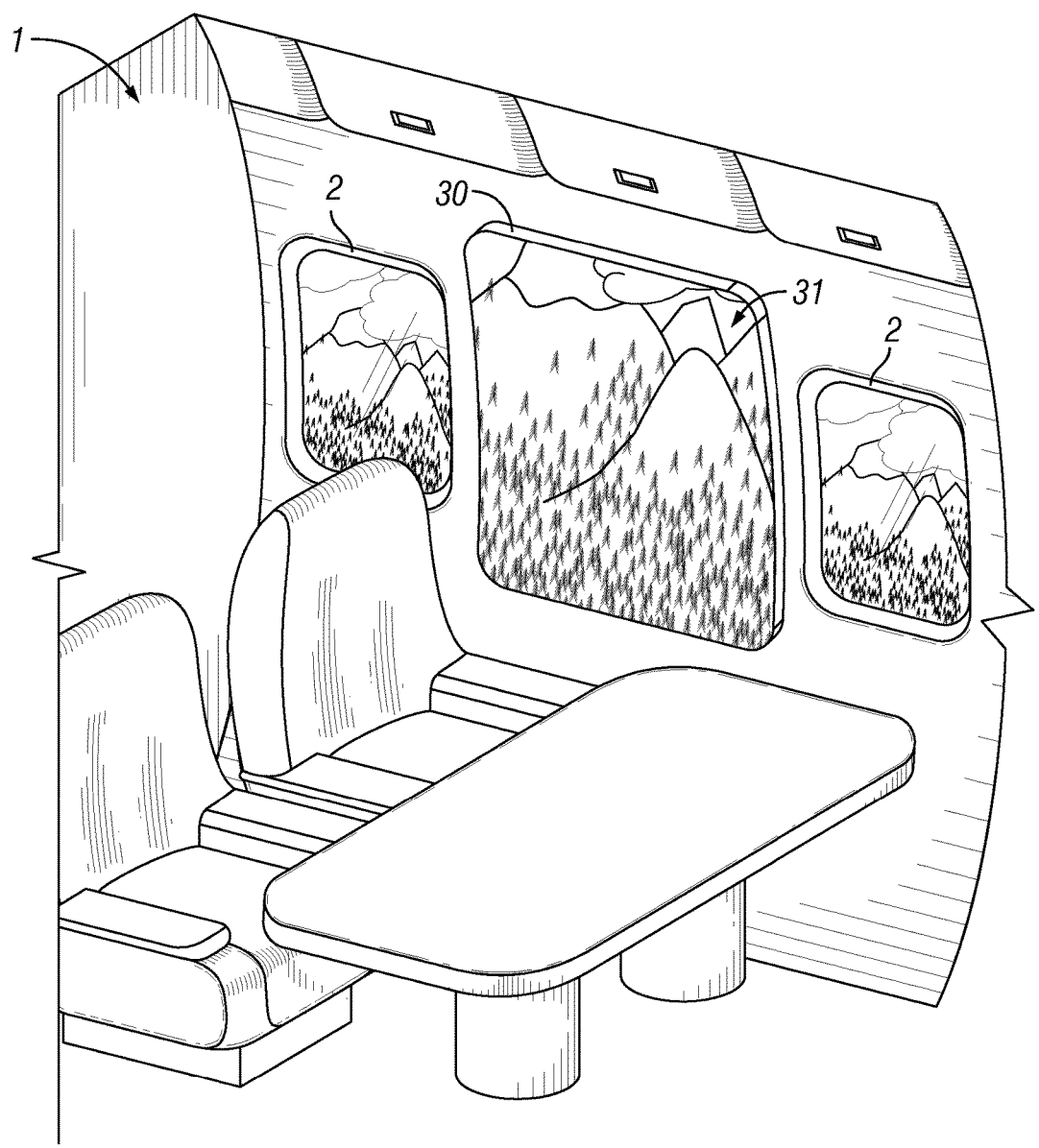
FIG. 4B shows a portion of an aircraft cabin with one embodiment of a display that is displaying a view exterior of the cabin.
Figure 4C:
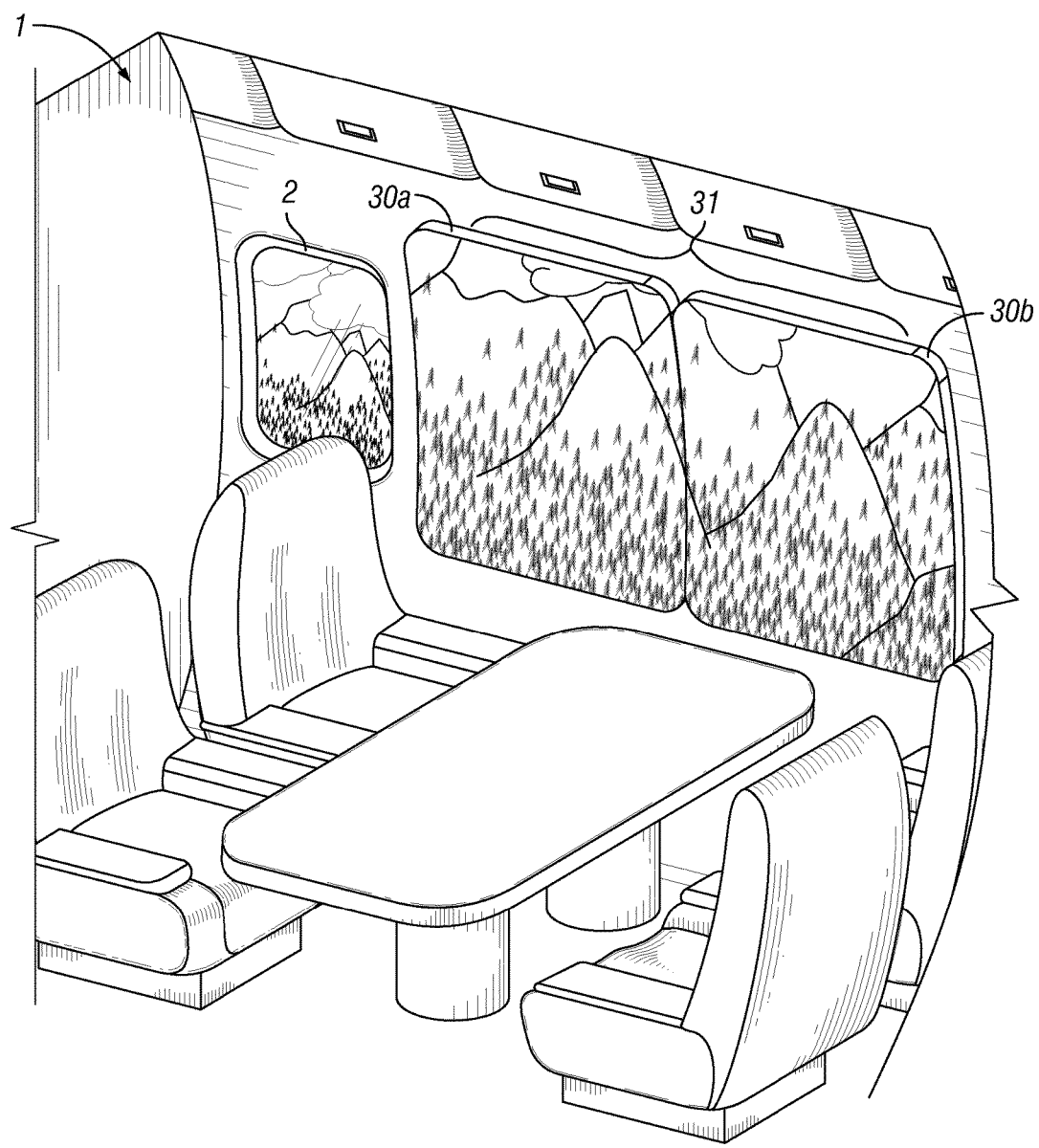
FIG. 4C shows a portion of an aircraft cabin with one embodiment of two displays displaying a panoramic view that is exterior of the cabin.
Figure 5:
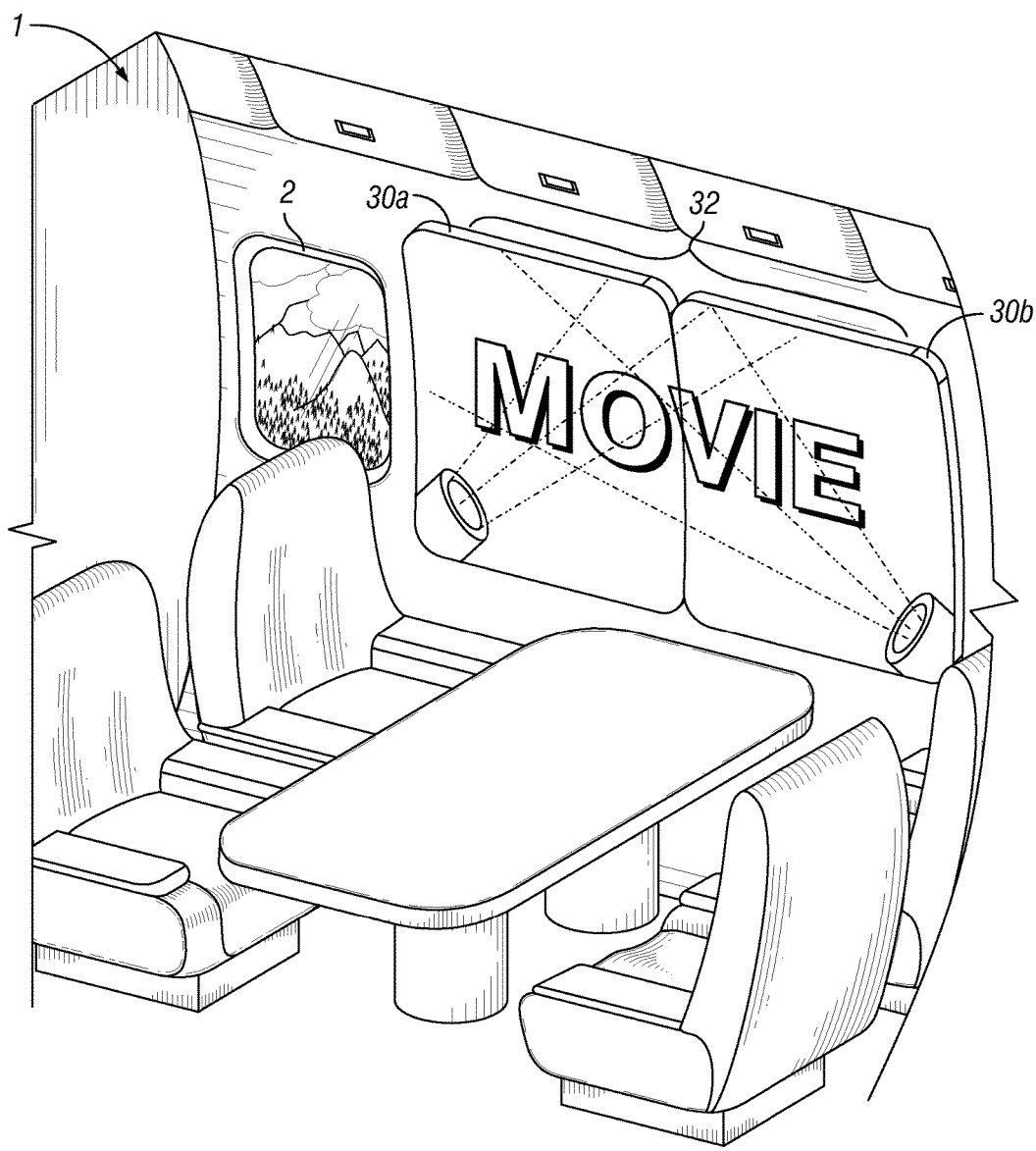
FIG. 5 shows a portion of an aircraft cabin with one embodiment of two displays displaying a video other than a view exterior of the cabin.

FIG. 4B shows a display 30, which may be a HD display, positioned over a window 2 displaying an image and/or video 31 of an outside view of the cabin 1. The display 30 shows an image and/or video 31 that is zoomed in or enlarged in comparison to the view through the adjacent windows 2. The larger display 30 permits a better view outside of the aircraft in comparison to the existing windows 2. FIG. 4C shows two displays 30a and 30b positioned adjacent to each other to form an even larger viewing area. The processor 40, discussed above, may be configured to combine or stitch together images and/or video captured by multiple cameras 20 to form a single combined image and/or video 31 to be shown on the single view area of the combine displays 30a and 30b. FIG. 5 shows a video 32 being shown on the combined displays 30a and 30b that is from a device other than the cameras 20. For example, the video may be provided from an electronic device 70, discussed above, that is connected to the processor 40 as an additional input. The use of an aircraft display system 100 may be used in VIP aircraft and premium class cabins 1. However, the use of an aircraft display system 100 disclosed herein may have applicability to the cabin 1 of any aircraft having windows 2. An aircraft cabin 1 may include a plurality of display systems 100 located throughout the cabin as would be appreciated by one of ordinary skill in the art having the benefit of this disclosure. The use of cameras 20 in connection with window plugs 10 permits that the system 100 may be moved or installed at different locations within an aircraft cabin 1, if desired, without complex structural modifications to the cabin 1.

The system 100 disclosed herein could also be used to provide a "virtual window" adjacent to a seat positioned within the center of the cabin 1 as shown by display 30 in FIG. 4B. For example, a display 30 may be positioned adjacent to a seat within the center of the cabin 1 and the display 30 may be used to display the external environment of the cabin 1 provided from images and/or video captured from a camera 20 positioned to capture the images and/or video of the external environment. The modularity of the system 100 permits the use of upgraded components (i.e. displays 30 and cameras 20) as they become available to enhance the passengers' experience within the cabin 1.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An apparatus comprising:
a first window plug configured to fit in a first existing window of an aircraft, the first window plug substantially fills a total area of the first existing window;
a first camera positioned within the first window plug, the first camera positioned to capture video of a first area outside the aircraft;
a flat panel display, wherein said flat panel display covers the first window plug and the first existing window;
a processor, the first camera communicating with the processor as an input and the processor communicating with said flat panel display as an output;
a control panel communicating with the processor, the control panel configured to control operation of said flat panel display;
wherein the control panel can cause said flat panel display to display the captured video of the first area outside the aircraft by the first camera;
a second window plug configured to fit in a second existing window of the aircraft;
a second camera positioned within the second window plug, the second camera positioned to capture video of a second area outside the aircraft;
the second camera communicating with the processor as an input; and
wherein the control panel can cause said flat panel display to display the captured video of the first area outside the aircraft by the first camera and to display the captured video of the second area outside the aircraft by the second camera.

2. The apparatus of claim 1, wherein the control panel can cause said flat panel display to display a video other than the captured video of the first area outside the aircraft.

3. The apparatus of claim 1, wherein the processor is configured to combine the captured video of the first area and the captured video of the second area to display a single video on said flat panel display.

4. The apparatus of claim 3, wherein the single video on said flat panel display is a 3D video.

5. The apparatus of claim 1, wherein said flat panel display covers both the first window plug and the second window plug.

6. The apparatus of claim 1, further comprising a user control device, the user control device is configured to control a zoom function and a pan function on the first camera.

7. A system comprising:
an aircraft having a cabin with a plurality of windows;
a processor;
a first display, the first display being an output to the processor;
one or more first window plugs each including a camera, each one or more first window plugs being positioned within a window of the cabin to capture video of an outside area of the aircraft, each camera being an input to the processor, wherein the first display covers at least one first window plug and at least one window and wherein the at least one first window plug is positioned between the first display and the at least one window; and
a control panel connected to the processor, the control panel configured to control operation of the first display;
wherein the control panel is configured to control the display on the first display of the captured video by the one or more cameras of the one or more first window plugs;
a second display, the second display being an output to the processor;
one or more second window plugs each including a camera, each one or more second window plugs being positioned within a window of the cabin to capture video of an outside area of the aircraft, each camera being an input to the processor, wherein the second display covers at least one second window plug and at least one window;
wherein the control panel is configured to control operation of the second display; and
wherein the control panel is configured to control the display on the second display the captured video by the one or more cameras of the one or more second window plugs.

8. The system of claim 7, wherein the first display generates a 3D video from captured video from at least two cameras from the one or more first window plugs.

9. The system of claim 7, wherein the first display is positioned adjacent to the second display.

10. The system of claim 9, wherein the first display and the second display form a single viewing area.

11. The system of claim 10, wherein the processor is configured to combine the captured video by the one or more cameras of the one or more first widow plugs with the captured video by the one or more cameras of the one or more second window plugs to display a combined single video on the first and second displays.

12. A method of creating a panoramic view in an aircraft cabin comprising:
positioning a first window plug within a first existing window of an aircraft cabin substantially covering the first existing window, the first window plug comprising a first camera;
connecting the first camera as an input to a processor;
positioning a first display directly over the first window plug within the aircraft cabin, the first window plug being positioned within the first existing window;
connecting the first display as an output to the processor;
positioning a second window plug within a second existing window of the aircraft cabin, the second window plug comprising a second camera;
connecting the second camera as an input to the processor, wherein the first display is positioned over both the first and second window plugs;
combining the captured video of the first area outside the aircraft by the first camera with a captured video of a second area outside the aircraft by the second camera; and
displaying the combined captured videos from the first and second cameras as a single video on the first display.

13. The method of claim 12, further comprising displaying a captured video of a first area outside the aircraft by the first camera on the first display within the aircraft cabin.

14. The method of claim 13, further comprising connecting a control panel to the processor, wherein the control panel controls the display of the captured video on the first display.

15. The method of claim 12, wherein the displaying the combined captured videos further comprises displaying a 3D video.

16. The method of claim 15, further comprising:
positioning a second window plug within a second existing window of the aircraft cabin, the second window plug comprising a second camera;
connecting the second camera as an input to the processor;
positioning a second display over the second window plug within the aircraft cabin;
connecting the second display as an output to the processor; and
displaying a captured video of a second area outside of the aircraft by the second camera on the second display within the aircraft cabin.

17. The method of claim 16, wherein the processor combines the captured video from the first camera with the captured video from the second camera to display a combined single video on the first and second displays.

18. The apparatus of claim 1, wherein said flat panel display has an area that is greater than the total area of the first existing window.

19. The system of claim 7, wherein the first display has an area that is greater than a total area of the at least one window.

* * * * *